United States Patent [19]

Lees

[11] Patent Number: 4,570,179

[45] Date of Patent: Feb. 11, 1986

[54] FILM SCANNER WITH IMPROVED RESPONSE TO SCATTERED LIGHT

[75] Inventor: Roger T. Lees, Rickmansworth, England

[73] Assignee: Eastman Kodak Company, Rochester, N.Y.

[21] Appl. No.: 548,889

[22] PCT Filed: Feb. 9, 1983

[86] PCT No.: PCT/GB83/00038

§ 371 Date: Sep. 26, 1983

§ 102(e) Date: Sep. 26, 1983

[87] PCT Pub. No.: WO83/02866

PCT Pub. Date: Aug. 18, 1983

[30] Foreign Application Priority Data

Feb. 12, 1982 [GB] United Kingdom ............... 8204084

[51] Int. Cl.[4] .................... H04N 9/09; H04N 3/16; H04N 3/36; H04N 9/11
[52] U.S. Cl. ...................................... 358/50; 358/41; 358/54; 358/55; 358/75; 358/209; 358/214; 358/225; 358/293; 358/294; 250/237 R
[58] Field of Search ............... 313/524, 532, 542, 543, 313/544; 250/237 R; 350/172, 173, 314, 397, 398, 408; 358/41, 50, 52, 54, 55, 209, 211, 214, 215, 216, 225, 285, 293, 294, 75, 76, 78, 80

[56] References Cited

U.S. PATENT DOCUMENTS 2,947,810 8/1960 Horsley .............................. 358/345
3,304,435 2/1967 Norwood ...................... 250/237 R
4,030,817 6/1977 Westell ............................... 350/314
4,289,275 11/1981 Critchlow et al. .................. 350/314

FOREIGN PATENT DOCUMENTS 1409153 10/1975 United Kingdom .

Primary Examiner—Michael A. Masinick
Assistant Examiner—Randall S. Svihla
Attorney, Agent, or Firm—David M. Woods

[57] ABSTRACT

A film scanner wherethrough light is transmitted to a photoresponsive device has an optical path whereby specularly transmitted light passes and impinges on a predetermined area of the device. Scattered light passes to the device but impinges upon the detecting surface thereof over a greater area than the predetermined area. To enhance the relative response of the device to scattered light, an attenuating filter is placed over the predetermined area of the detecting surface.

9 Claims, 5 Drawing Figures

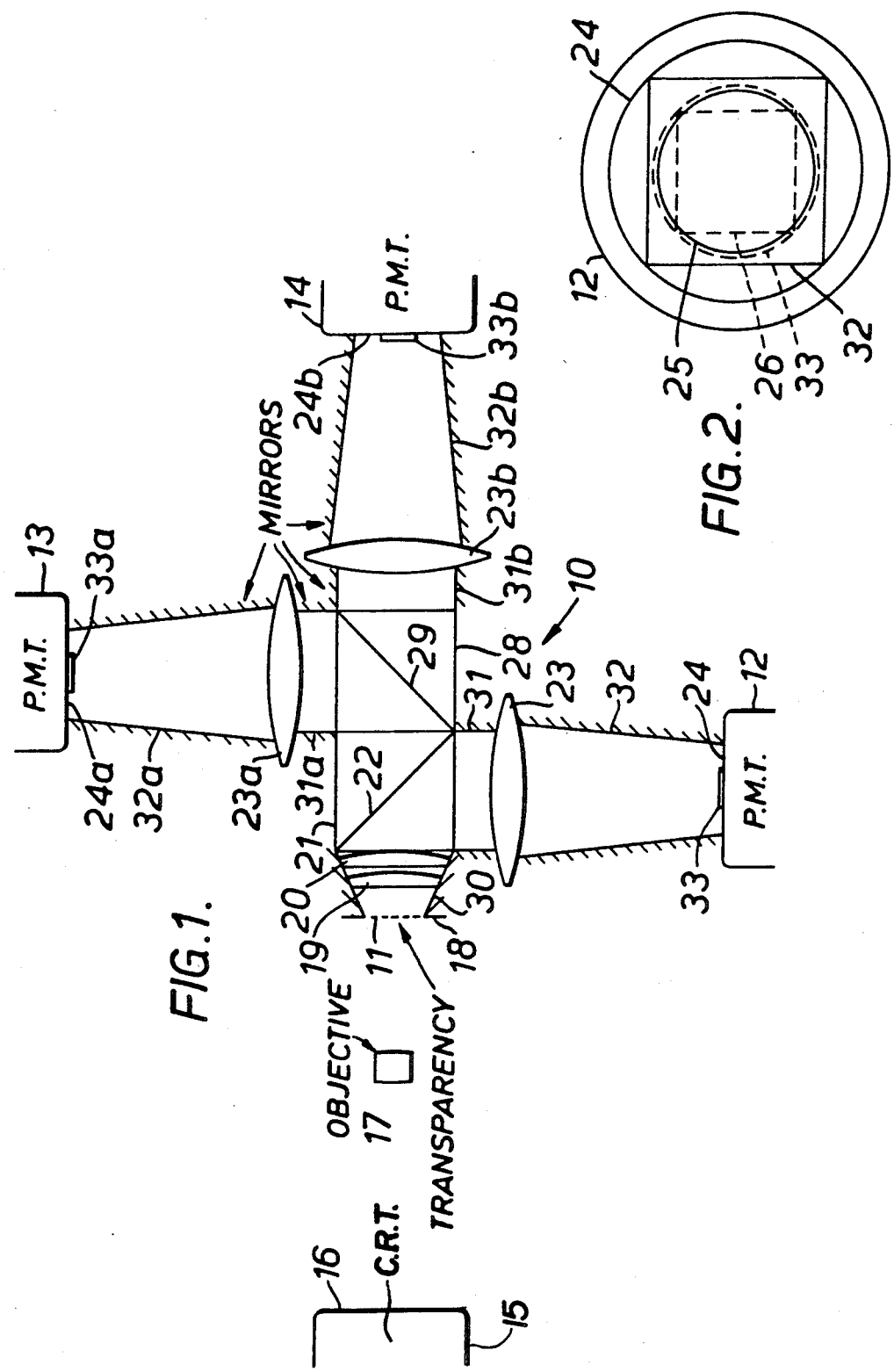

FILM SCANNER WITH IMPROVED RESPONSE TO SCATTERED LIGHT

This invention concerns the detection and measurement of light by photomultipliers or similar photoresponsive devices having a detecting surface whereupon the light to be detected and/or measured impinges. One example of an apparatus of this kind is a film scanner wherein a spot of light scans an area of film such as a photographic negative or positive and the transmitted light is arranged to fall on the detecting surface of a photomultiplier. Such detecting surfaces do not have exactly uniform response and it is known to arrange the light to fall on a predetermined static area of the surface. In this way, all specularly transmitted light is detected and measured.

In a colour scanner, the light transmitted by the film is split into a plurality of beams of different wavelengths, each beam impinging upon a predetermined area of a detecting surface of a respective photomultiplier.

Such an apparatus is described in U.S. Pat. No. 2,947,810. The transmitted light may be split into the separate beams by dichroic mirrors or by part silvered mirrors in either case with an appropriate colour filter in front of each detecting surface.

One problem which exists in measuring the transmission of light through a film is that dirt often exists on the surfaces of the film or scratches are present in the surfaces of the film. The dirt or the scratches scatter the light impinging on the film and the scattered light is no longer transmitted specularly in a controlled manner to the predetermined area of the detecting surface of the correct photomultiplier.

Such scattered light may be (a) lost (b) impinge upon the detecting surface outside the predetermined area and/or (c) impinge upon the wrong detecting surface within or outside the predetermined area thereof.

In each case, the response of the photomultipliers is incorrect and the electrical output signals of the photomultipliers do not faithfully represent the picture content of the scanned area of the film.

If the electrical output signals are used to produce a picture either directly as in a television system or indirectly by controlling the exposure of a photosensitive material, the incorrect signals resulting from dirt or a scratch on the surface of the film produce a line or spot of contrasting density which is particularly noticeable, for example, as a white spot or line on a colour print.

Similar incorrect output signals are obtained if, for example, faults or spots of dirt are on any optical surface of the apparatus adjacent the film.

An electronic partial solution to this problem is described in the above mentioned U.S. Pat. No. 2,947,810 and a further similar electronic partial solution is described in U.K. Specification No. 1409153.

The present invention seeks to overcome or minimise the problem of scratches in and/or dirt on film in an extremely simple manner and is based on the fact that, in a reproduction, changes in colour are much less noticeable than changes in density.

In accordance with the present invention, there is provided a film scanner with improved response to scattered light. The scanner converts light directed through a transparency into an electrical signal representative of the picture content of the transparency. The improved response is obtained by providing a photomultiplier or like photoresponsive device having a photosensitive detecting surface, a predetermined area of said surface being arranged to detect light specularly transmitted to the device, an attenuating filter covering said predetermined area whereby the response of the device to scattered light impinging upon that part of the detecting surface not covered by the filter is enhanced relative to the response of the device to the specularly-transmitted light impinging upon that part of the detecting surface covered by the filter.

In film scanning apparatus, the predetermined area is preferably coincident and commensurate with an image, on the detecting surface of the photomultiplier or like photoresponsive device, of the aperture of an objective used to focus the scanning spot onto an area of film to be scanned.

The invention will be described further, by way of example, with reference to the accompanying drawings, in which:

FIG. 1 is a diagrammatic view of a film scanner in which the attenuating filter of the present invention finds utility;

FIG. 2 is a diagrammatic front elevation of the photocathode surface of a photomultiplier having an attenuating filter in accordance with the present invention;

Figure 3:
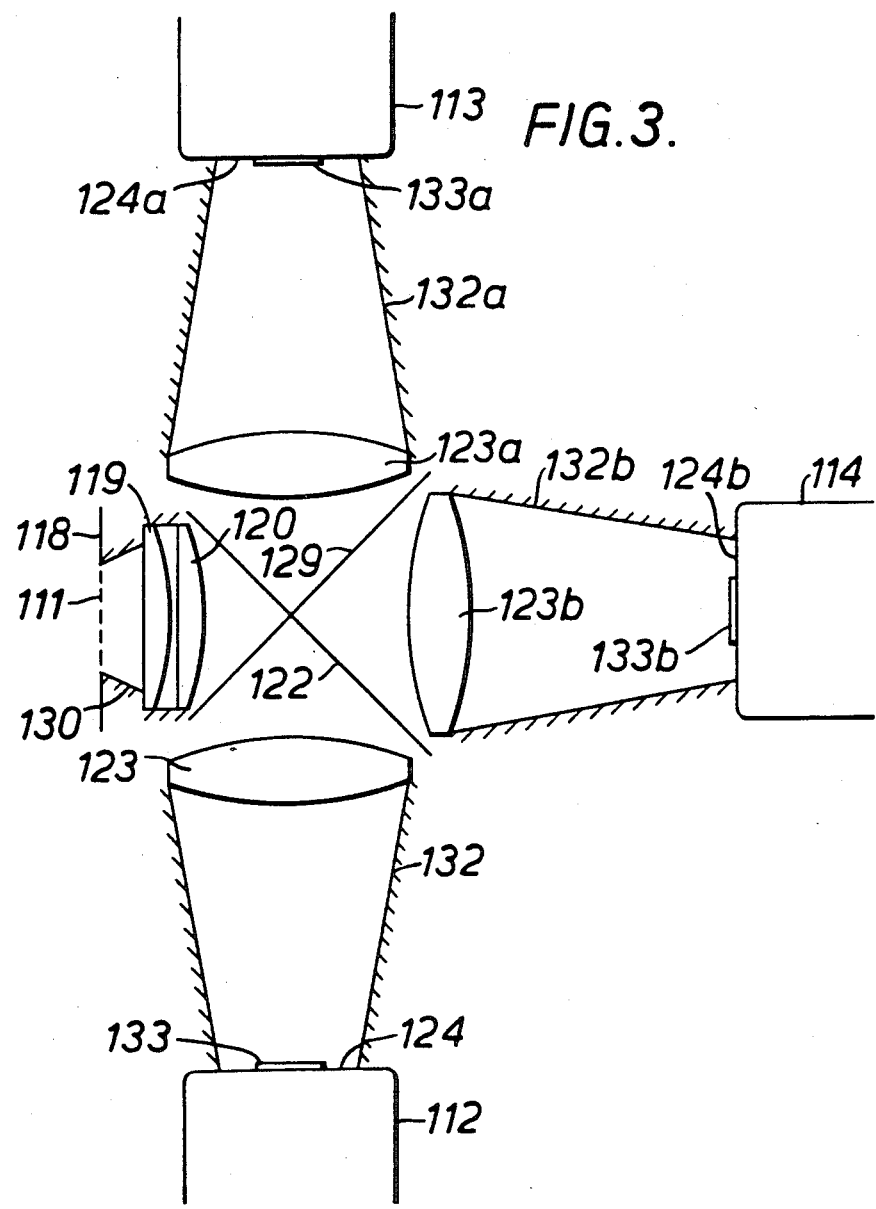
FIGS. 3 and 4 are diagrammatic views of alternative scanning apparatus in which attenuating filters in accordance with the present invention may be used.

Referring to FIGS. 1 and 2 of the drawings, a film scanner 10 is arranged to scan a colour transparency 11 (positive or negative) and to provide image information as to the colour content and density of the transparency in the form of electrical signals at the outputs of three photomultiplier tubes 12, 13 and 14.

The scanner comprises a cathode ray tube 15 and conventional electrical circuits (not shown) which provide horizontal and vertical time bases to produce a raster on the face 16 thereof of relative dimensions at least commensurate with the dimensions of the transparency 11 to be scanned. An objective 17 images the raster onto the transparency 11 located in a film gate 18. Lenses 19, 20 direct light transmitted by the transparency onto a dichroic beam splitting cube 21 so that specularly transmitted light impinges at approximately 45° onto a first dichroic mirror 22. The mirror reflects light of one wavelength range, for example, red and transmits light of the remaining visible spectrum range for example, blue and green. The reflected red light exits from the cube 21 and passes through a lens 23 to strike the photosensitive area, the photocathode 24 of the photomultiplier 12. The raster on the cathode ray tube faceplate 16, if imaged on the photocathode 24, would be rectangular as shown at 26 and lack of uniformity of the photosensitive surface, the photocathode 24, would give rise to incorrect signals as the imaged flying spot moved across the area 26. For this reason, the lens 23, together with the lenses 19 and 20, image the aperture of the objective 17 onto the photocathode 24 as a circle 25 or polygon if the aperture is formed by an iris diaphragm. In this way, the whole of the area of the circle 25 is used continuously and any lack of uniformity of response is avoided.

All red light, specularly transmitted by the transparency 11, will fall within the circle 25 of the photocathode 24.

As mentioned above, specular blue and green light are transmitted by the dichroic mirror 22 substantially without deviation and pass to a cube 28 similar to the cube 21. The cube 28 contains a dichroic mirror 29 which reflects blue light and transmits green light. The transmitted blue and green light entering the cube 28 strike the mirror 29, the blue light being reflected towards the photomultiplier 13 and the green light being transmitted towards the photomultiplier 14.

The "blue" path of the photomultiplier tube 13 and the "green" path to the photomultiplier 14 are optically identical to the "red" path to the photomultiplier 12 and reference numerals for optical components of these paths are suffixed 'a' and 'b' respectively and will not be described further.

In the prior art, it is known to position over the surface of each photocathode or in the optical path thereof, a filter (not shown) to match the response of the respective photomultiplier to the wavelength of the light impinging thereon and to act, with the dichroic mirror, to provide sharper cut-off of the wavelength band transmitted to the photomultiplier so that the electrical outputs of the photomultipliers correspond to the respective densities of the transparency.

If there is a scratch in either of the surfaces of the transparency 11 or dirt on either surface thereof, light from the flying spot of the cathode ray tube 15 will be scattered. This would normally lead to an incorrect output of one or more of the photomultipliers 12, 13 or 14.

The film scanner of the present invention has mirrors 30 of truncated pyramidal form surrounding the gate 18 and all scattered light which passes through the transparency 11 is reflected by the mirrors 30, passes through the lenses 19, 20 and into the beam splitting cube 21. This scattered light impinges upon the dichroic mirror at all angles from the optimum 45° angle up to nearly 90° and down to nearly 0°. Red light impinging on the mirror 22 at approximately 45° will be reflected. Blue and green light impinging at approximately 45° will be transmitted.

At angles deviating from the optimum 45°, the reflection and transmission characteristics of the mirror 22 vary. In this way, some blue and some green light will be reflected towards the photomultiplier 12 and conversely some red light will be transmitted by the mirror 22.

The dichroic mirror 29 also has an optimum impingement angle of 45° and consequently will transmit some scattered blue and red light and will reflect some scattered red and green light.

Irrespective of towards which of the photomultipliers 12, 13 and 14 the scattered light is transmitted or reflected by the mirrors 22 and 29, box mirrors 31, 31a and 31b reflect and contain such light and pass it towards the lens 23, 23a and 23b, and truncated pyramidal mirrors 32, 32a and 32b reflect and contain such light and pass it towards the photocathode 24, 24a or 24b. Such light is scrambled by the mirror boxes and then strikes the particular photocathode substantially evenly everywhere within the rectangle defined by the abutting end of the respective mirror 32 as shown in FIG. 2.

However, with scattered light some losses are inevitable. Such losses may occur because of absorption by dirt or because of total internal reflection within the transparency 11 caused by scattering. There is loss upon reflection by the mirrors 30, 31, 31a or 31b, and 32, 32a or 23b. Some light is lost within the cubes 21 and 28 and the lenses 19, 20 and 23, 23a or 23b.

The resultant effect is that the output signals of the photomultipliers 12, 13 and 14 are lower than would be the case if no dirt or scratch exists at the particular part of the transparency 11.

In accordance with the present invention, a respective attenuating filter 33, 33a and 33b (see FIG. 2), indicated in dashed lines to differentiate the filter from the circle 25, is located over the area 25 of the photocathode 24, 24a and 24b. Any light which falls on the photocathode outside the area 25 and within the rectangle defined by the mirror 32, 32a or 32b, which light must be scattered light, is not attenuated and the responses of the photomultiplier to such light is thereby enhanced.

The attenuating filter 33, 33a or 33b may replace the normal photomultiplier response correcting filter or may be additional thereto. It may be of radially decreasing density from the circle 25 outwardly. The attenuating filter may be larger than the circle 25 provided that the signal due to scattered light is enhanced relative to the signal due to specular light impinging within the circle 25.

The resultant outputs of the photomultipliers can, by choice of the correct attenuation by the filters 33, 33a and 33b, provide substantially level signals varying only by image density information.

It will be appreciated that the individual signals of the photomultipliers 12, 13 and 14 may be incorrect as far as image colour information is concerned but the human eye is much more sensitive to density variations than to colour variations. A scratch which, for example, would normally reproduce as a white line in a print will be reproduced at substantially identical density to the adjacent areas and not be detectable by the human eye because the only difference is in colour. Similarly a spot of dirt may be reproduced as an undetectable spot of identical density to adjacent areas instead of as a very noticeable white spot.

In monochrome reproduction using the apparatus of the invention, scratches and dirt on a monochrome transparency merely lead to a slight loss of definition in the reproduction and are otherwise undetectable.

The apparatus shown in FIG. 1 of the accompanying drawings is described in more detail in our accompanying U.S. patent application Ser. No. 556,235 filed on even date herewith in the name of P. B. Watt.

It is possible to utilise attenuating filters in other scanning apparatus, for example, that shown in FIG. 3. In this Figure like parts have been given similar reference numerals, prefixed by "1", to those shown in FIG. 1.

By appropriately specifying the transmission efficiency of the attenuating filter of the present invention, it is not essential for the film scanner to contain all scattered light. The proportion that is contained can be enhanced relative to the specularly transmitted light to an extent sufficient to minimise or eliminate the noticeable reproduction of scratches and dirt on the film. Thus, it is not essential that dichroic beam splitting mirrors be mounted in cubes. As shown, crossed dichroic mirrors 122 and 129 mounted in air may be utilised.

Figure 4:
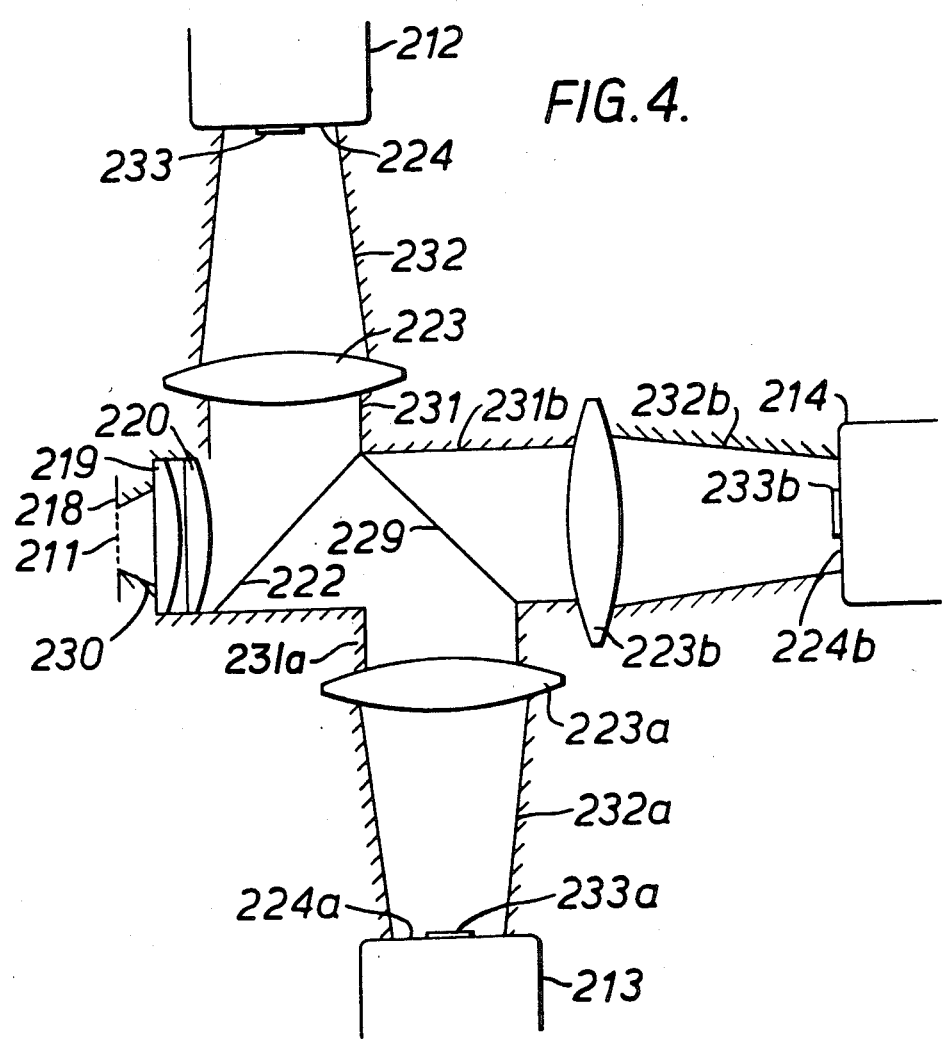

It is difficult to make and mount crossed dichroic mirrors and consequently FIG. 4 diagrammatically illustrates a scanning apparatus using two separate dichroic mirrors 222 and 229. In this figure, like parts to those shown in FIG. 1 have been given similar reference numerals prefixed by "2".

A defect arises when beam splitting cubes are not used. This is due to the fact that the amount of scattered light which is lost when the cubes are not used may be laterally or vertically biased depending on the location of the dichroic mirror and the entrance to its respective first mirror box.

Figure 5:
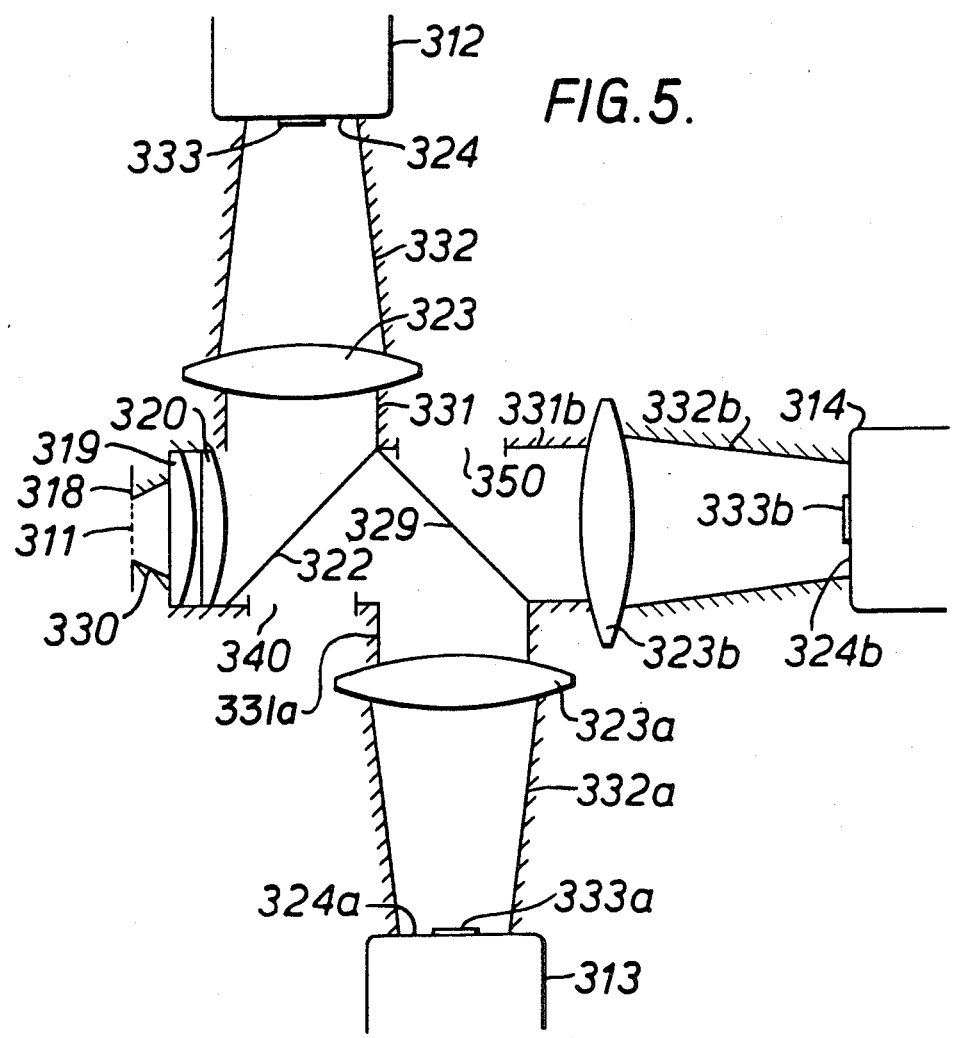
FIG. 5 is a diagrammatic view of a modification applicable to the scanning apparatus shown in FIGS. 3 and 4.

This can be overcome by the apparatus shown diagrammatically in FIG. 5. In this figure, like reference numerals prefixed "3" are used for similar parts to those shown in FIG. 1.

The only difference in this apparatus to that shown in FIG. 4 is that loss matching "holes" 340 and 350 are provided behind the dichroic mirrors 322 and 329 respectively to compensate for lateral bias in loss of scattered light in the apparatus of FIG. 4.

I claim:

1. A film scanner for converting light directed through a transparency into an electrical signal representative of the picture content of the scanned area of the transparency, said scanner comprising:
    means for generating a specular scanning light beam;
    means for supporting the transparency in the path of said scanning beam such that some scanning light transmits through the transparency as specular light and other scanning light scatters upon striking scratches or dirt on the transparency;
    a photoresponsive device having a photosensitive detecting surface for receiving the scattered and specularly-transmitted light and generating an electrical signal therefrom, said detecting surface including a smaller central area thereof for receiving substantially all of the specularly-transmitted light; and
    means for attenuating the response of said photoresponsive device to said specularly-transmitted light whereby the response of said device due to scattered light is enhanced relative to the response due to specularly-transmitted light.

2. A film scanner as claimed in claim 1 in which said attenuating means comprises an attenuating filter arranged over at least said smaller area of said detecting surface.

3. A film scanner as claimed in claim 2 wherein said attenuating filter is a correcting filter for matching the response of said photoresponsive device and the wavelength of the light impinging upon said correcting filter.

4. A film scanner as claimed in claim 1 in which said attenuating means comprises a filter of the type wherein the light-attenuating density of the filter decreases radially outwardly from said smaller area.

5. A color film scanner for converting light directed through a color transparency into an electrical signal representative of the color picture content of the scanned area of the color transparency, said scanner comprising:
    means for generating a specular scanning light beam;
    means for supporting the color transparency in the path of said scanning beam such that some scanning light transmits through the color transparency as specular light representing the color picture content and other scanning light transmits through the color transparency as scattered light caused by scratches or dirt on the color transparency;
    means for splitting the transmitted light into a plurality of secondary beams according to color content;
    a plurality of photoresponsive devices each having a photosensitive detecting surface for receiving the scattered and specularly-transmitted light comprising a respective secondary beam and generating an electrical signal therefrom, each detecting surface including a smaller central area thereof for receiving substantially all of the specularly-transmitted light; and
    means for attenuating the response of at least one photoresponsive device to said specularly-transmitted light whereby the response of said device due to scattered light is enhanced relative to the response due to specularly-transmitted light.

6. A color film scanner as claimed in claim 5 in which said attenuating means comprises an attenuating light filter arranged over at least said smaller area of said detecting surface in order to attenuate the response of a respective photoresponsive device to specularly-transmitted light impinging upon said filter.

7. A color film scanner as claimed in claim 6 wherein said attenuating light filter is a correcting filter for matching the response of a respective photoresponsive device and the wavelength of the light impinging upon its correcting filter.

8. A color film scanner as claimed in claim 6 in which said light filter has a variable density characteristic and is arranged relative to said smaller area such that said density decreases outwardly from said smaller area.

9. A color film scanner as claimed in claim 5 in which said splitting means comprises a plurality of dichroic mirrors arranged in the path of the transmitted light for forming red, green and blue secondary beams.

* * * * *